United States Patent [19] [11] Patent Number: 4,627,063
Hosokawa [45] Date of Patent: Dec. 2, 1986

[54] LASER OSCILLATOR
[75] Inventor: Tetsuo Hosokawa, Tokyo, Japan
[73] Assignee: NEC Corporation, Tokyo, Japan
[21] Appl. No.: 640,747
[22] Filed: Aug. 14, 1984
[30] Foreign Application Priority Data
Aug. 15, 1983 [JP] Japan ................. 58-139003
[51] Int. Cl.$^4$ .............................................. H01S 3/00
[52] U.S. Cl. ........................................ 372/38; 372/25; 372/70
[58] Field of Search ................ 372/61, 28, 33, 69, 372/70, 76, 25

[56] References Cited
U.S. PATENT DOCUMENTS
3,430,159 2/1969 Roeber .................................. 372/38
4,160,190 7/1979 Akase et al. ......................... 378/38
4,276,497 6/1981 Burbeck et al. ..................... 372/70
4,394,764 7/1983 Ishikawa ............................. 372/38
4,398,129 8/1983 Logan .................................. 372/25
4,489,415 12/1984 Jones, Jr. ............................ 372/70

Primary Examiner—Léon Scott, Jr.
Attorney, Agent, or Firm—Schwartz, Jeffery, Schwaab, Mack, Blumenthal & Evans

[57] ABSTRACT

The present disclosure relates to a laser oscillator in which a laser element is pumped by a discharge tube. The discharge tube is excited by a power supply unit having a plurality of energy storage circuits. An exciting current supply controls the energy storage circuits and connects them to the discharge tube in a predetermined sequence at predetermined time intervals such that the level of a trailing discharge current produced in the discharge tube by one of the energy storage units is raised above a predetermined level before the level of a leading discharge current produced by a preceding one of the energy storage units is lowered below the predetermined level.

4 Claims, 4 Drawing Figures

LASER OSCILLATOR

BACKGROUND OF THE INVENTION

The present invention relates to a laser oscillator and, more particularly, to a laser oscillator which is pumped by a discharge tube.

Such a laser oscillator is well known, for example, see "Flash Lamp Discharge and Laser Efficiency", APPLIED OPTICS, vol. 13, No. 10, October 1974, pp. 2300 to 2312.

In this type of laser oscillator, the laser element is optically excited or optically "pumped" by the light which is generated by the discharge tube. A predetermined high voltage obtained by an energy storage circuit is applied between both electrodes of the discharge tube. The discharge tube is also provided with trigger pulses of a predetermined pulse repetition frequency equal to that of the laser pulse, and the laser pulse is generated in response to each trigger pulse. Such a conventional laser oscillator, which operates on the basis of the pulse pumping or excitement by a discharge tube, however, suffers from the following disadvantage.

First of all, it is pointed out that this type of laser oscillator can exhibit only an extremely low laser efficiency which is expressed as the ratio of the laser energy to the exciting power. For instance, in case of a pulse pumped by YAG laser, the laser efficiency is as low as 1 to 2%. In consequence, associated equipment such as the energy storage circuit and the power supply circuit must be large in size. In case of portable laser equipment using batteries as the power source, the efficiency of power consumption is impractically low.

To explain in more detail, the gas contained in the discharge tube such as xenon or krypton, is transformed into a plasma state by the discharge current. The temperature of this plasma depends upon the discharge current density and the spectrum and the intensity of the light emitted from the plasma depend upon the plasma temperature. On the other hand, the laser element generates the laser based on the absorbed light having a wavelength peculiar to the element. In order to maximize the laser efficiency, therefore, it is necessary to select the plasma temperature such that the emission of light of the wavelength peculiar to the laser element is maximized. This means there exists a certain level of electric current density which is optimum. For instance, in the case of YAG laser, the maximum laser efficiency is attained when the discharge current density ranges generally between 4000 and 5000 A/cm$^2$. This optimum range of discharge current density varies slightly depending on the kind of the gas in the discharge tube. Any discharge current density above or below this optimum range cannot provide sufficiently high energy efficiency of the laser. The electric current flowing through the discharge tube in the laser oscillator of the type described is pulsating, and the density of the discharged current is gradually increased from a low level to a maximum level and then decreases gradually. This means that the optimum discharge current density can be held only for a short time period, resulting in an impractically low laser efficiency.

SUMMARY OF THE INVENTION

Accordingly, an object of the invention is to provide a laser oscillator which can remarkably improve the laser efficiency.

Another object of the invention is to provide a laser oscillator incorporating an energy storage circuit having an improved circuit arrangement.

Still another object of the invention is to provide a laser oscillator which can remarkably reduce the power consumption of the batteries.

To these ends, according to the invention, there is provided a laser oscillator comprising: a laser element; a discharge tube for optically pumping the laser element; an exciting power supply unit having a plurality of energy storage circuits adapted to supply the discharge tube with exciting power; and an energy storage controlling unit for controlling the supply of the exciting power from the energy storage circuits to the discharge tube.

These and other objects, features and advantages of the invention will become clear from the following description of the preferred embodiments taken in conjunction with the accompanying drawings.

DETAILED DESCRIPTION OF THE PREFERRED EMBODIMENTS

Figure 1:
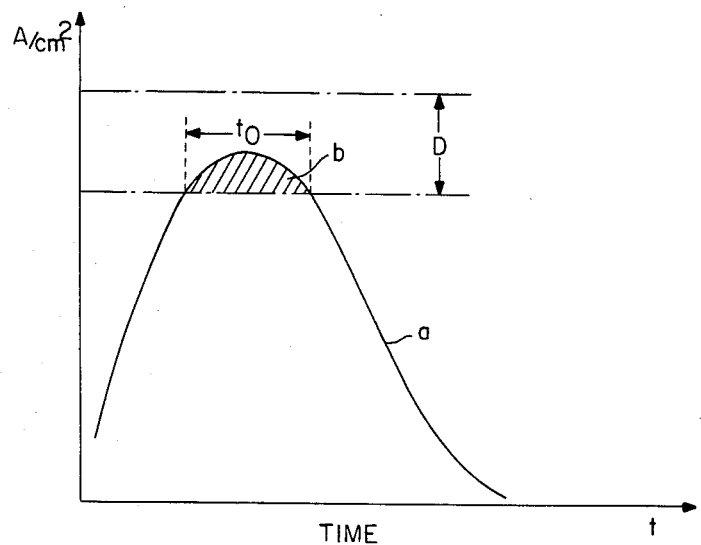
FIG. 1 is a chart showing the discharging characteristics of the discharge circuit of a conventional laser oscillator.

Referring to FIG. 1, in the conventional laser oscillator, a discharge tube is supplied with exciting power from an energy storage circuit, and a laser element is optically pumped or excited in a pulsating manner upon receipt of trigger pulses, thereby to generate a laser. In consequence, as will be seen from FIG. 1, the discharge circuit having a discharge characteristic a of the discharge current density A/cm$^2$ in relation to time t exhibits optimum optical pumping only within a time period which corresponds to the region b included in the optimum range D of the discharge current density. Namely, in any region other than b, the discharge current density does not fall within the range of optimum density, so that the efficiency of the pumping is not high.

Figure 2:
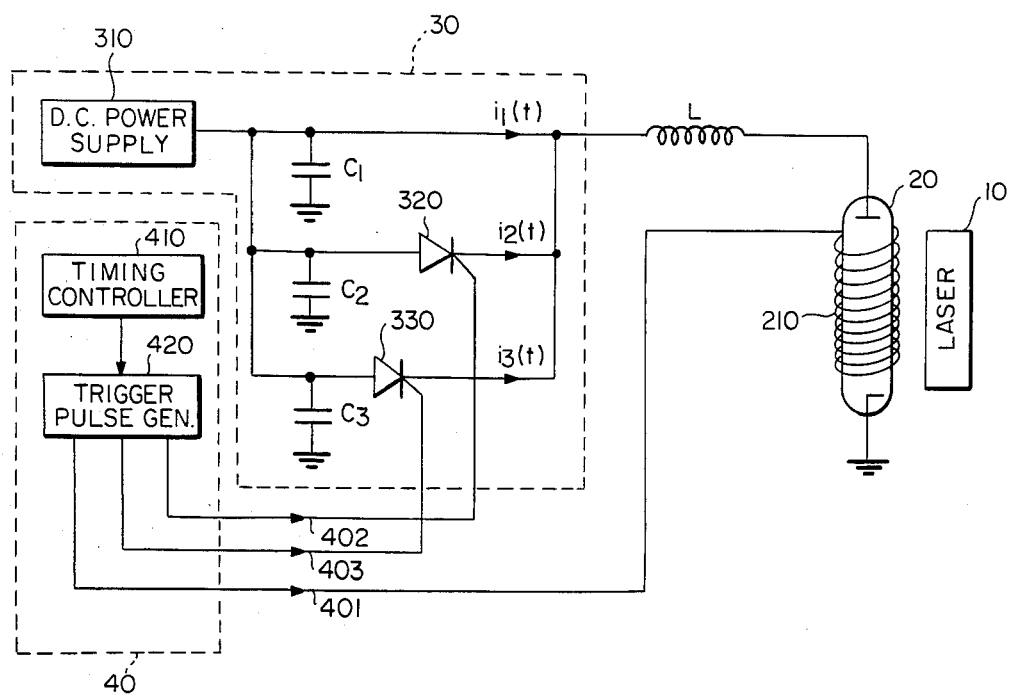
FIG. 2 is a block diagram of an embodiment of the present invention.

Turning on, FIG. 2, an exciting power of a predetermined level is supplied from an exciting power supply unit 30 to the discharge tube 20 through a choke coil L. The discharge tube 20 is also provided with trigger pulses of predetermined level and pulse width and having a frequency equal to the oscillation frequency of the laser, from a trigger pulse generating circuit 420 of an exciting power supplying unit 40. The discharge tube 20 discharges to emit light in response to each trigger pulse to effect an optical pumping of a laser element 10 thereby oscillating the laser. The choke coil L is used here to prevent the peak discharge current from exceeding a predetermined level, in each discharge cycle of the discharge tube 20.

The exciting power supply unit 30 is composed of a D.C. power source 310, three capacitors $C_1$, $C_2$ and $C_3$, and two thyristors 320 and 330. The D.C. power supply 310 and the capacitor $C_1$ in combination constitute a first energy storage circuit, while the D.C. power source 310, capacitor $C_2$ and the thyristor 320 in combination constitute a second energy storage circuit. A third energy storage circuit is constituted by the D.C. power source 310, capacitor $C_3$ and the thyristor 330. Thus, the exciting power supply unit 30 includes the first to third energy storage circuits.

A voltage of a predetermined level is applied constantly to the discharge tube 20 by the first energy storage circuit.

A supply of exciting current by the second and third energy storage circuits in the exciting power supply unit 30 is effected as a result of discharge from the capacitors $C_2$ and $C_3$ through the operation of the thyristors 320 and 330 which are gated successively at predetermined time intervals after the supply of the exciting power from the first energy storage circuit through the discharge of the capacitor $C_1$. More specifically, the supply of exciting power from the first to third energy storage circuits is executed in the following manner.

The discharge tube 20, which is constantly supplied with a voltage of a predetermined level from the first energy storage circuit in the exciting power supply circuit 30, also receives trigger pulses, which trigger the pulsating discharge, through a trigger wire 210 from the output line 401 of the exciting power supply controlling unit 40.

Figure 3:
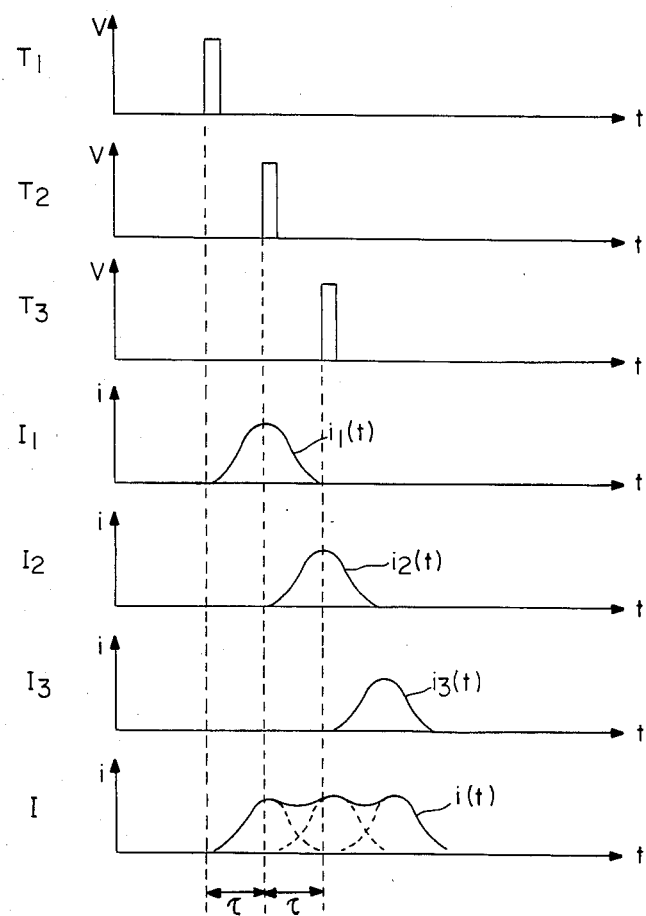
FIG. 3 is a diagram which shows the relationship between the time and the trigger pulses and discharge currents.

The exciting power supply controlling unit 40 is constituted by parts such as a timing control circuit 410, and a trigger pulse generating circuit 420. The trigger pulse generating circuit 420, which receives time interval setting pulses controlled and set by the timing control circuit 410, produces and delivers three trigger pulses $T_1$, $T_2$ and $T_3$ of a predetermined level and pulse width at a time interval $\tau$ as shown in FIG. 3. The trigger pulse $T_1$ is supplied to the trigger wire 210 through an output line 401, while the trigger pulse $T_2$ and the trigger pulse $T_3$ are delivered, respectively, to the thyristors 320 and 330 of the exciting power supplying section 30, through output lines 402 and 403, respectively, thereby making these thyristors operate.

As a result, when the trigger pulse $T_1$ is supplied to the trigger wire 210, the discharge tube 20 discharges in response to the exciting power which is supplied thereto from the capacitor $C_1$ in the first energy storage circuit. Consequently, discharge current equal to the current $i_1(t)$ from the capacitor $C_1$ flows in the discharge tube 20.

When the thyristor 320 is turned "on" by the trigger pulse $T_2$, the capacitor $C_2$ of the second energy storage circuit and the discharge tube 20 discharge consecutively, so that the discharge current $i_2(t)$ flows in the discharge tube 20.

As in the case of the trigger pulse $T_2$, the trigger pulse $T_3$ turns the thyristor 330 "on" so that the discharge tube 20 discharges through the thyristor 330 concurrently with the discharge from the capacitor $C_3$ of the third energy storage circuit $C_3$. A discharge current $i_3(t)$ flows through the discharge tube 20.

FIG. 3 is a diagram which shows the relationship between the time and the trigger pulses $T_1$, $T_2$, $T_3$ and discharge currents $I_1$, $I_2$, $I_3$.

Referring to this Figure, $T_1$, $T_2$ and $T_3$ represent the trigger pulses supplied by the exciting power supply controlling unit 40. These pulses have an equal level and are generated successively at a time interval $\tau$.

Discharge currents in the discharge tube 20 caused by the trigger pulses are represented by $I_1$, $I_2$ and $I_3$, respectively. More particularly, in response to the trigger pulse $T_1$ the discharge current $i_1(t)$ is caused. Similarly, discharge currents $i_2(t)$ and $i_3(t)$ are caused responsive to the trigger pulses $T_2$ and $T_3$, respectively. These discharge currents appear in the form of pulses of the same level and waveform. In FIG. 3, V and i represent the levels of voltage and current, respectively.

These discharge currents in combination form a basic composite discharge current $i(t)$ as shown in FIG. 3. Thus, in the operation of the laser oscillator, this composite discharge current flows in the discharge tube 20.

Figure 4:
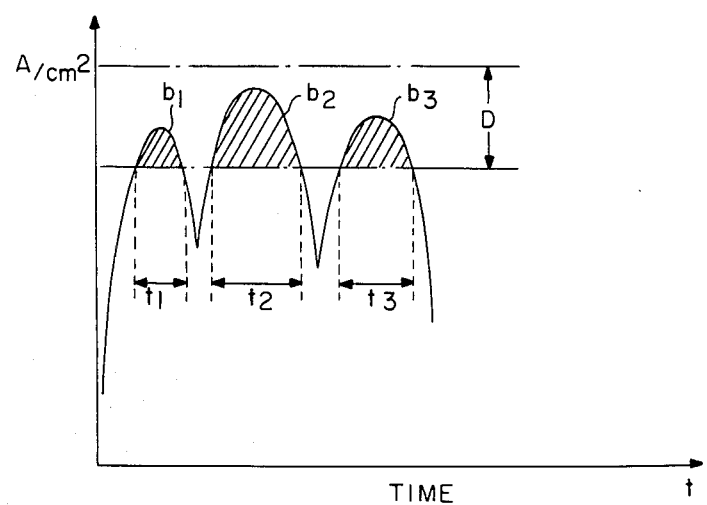
FIG. 4 is a diagram which shows the discharge characteristics of the discharge tube of the embodiment shown in FIG. 2.

FIG. 4 shows the discharge characteristics of the discharge tube of the embodiment shown in FIG. 2. As stated before, in the conventional laser oscillator incorporating a single energy storage circuit, the optimum discharge current is obtained only in the period b shown in FIG. 1 and included in the range D of the optimum discharge current density. In the illustrated example, however, the portion b shown in FIG. 1 is increased to three portions, $b_1$, $b_2$ and $b_3$ so that the discharge tube 20 discharges in each of the periods $t_1$, $t_2$ and $t_3$ in which the optimum discharge current densities are maintained.

Thus, the discharge time of the optimum current discharge density is remarkably increased so that the discharge tube 20 discharges over a longer time period. In consequence, it is possible to remarkably improve the laser efficiency.

It will be clear that, although in the described embodiment the exciting power supply section 30 has 3 (three) energy storage circuits, this number is not exclusive and the exciting power supply unit can have any desired number of energy storage circuits.

In the embodiment shown in FIG. 2, a predetermined voltage is applied constantly to the discharge tube 20, so that the a discharge is made each time the trigger wire 210 receives the trigger pulse. This discharging method, however, is not exclusive and may be substituted by any other known system. An example of such a method is a the so-called "Simmer method" in which exciting power from a plurality of exciting power generating circuits triggered by the trigger pulses is applied between the electrodes of the discharge tube 20, while a small current on the order of several tens of mA (milliamperes) is made to flow in the discharge tube 20 so as to maintain the gas in the tube always conductive. To execute this method, a thyristor, the same as the thyristors 320, 330 is disposed in the output line of the first energy storage circuit of the exciting power supply section 30, and this thyristor is gated by the trigger pulse $T_1$. The small current which is to be supplied constantly to the discharge tube 20 may be supplied by the D.C. power supply 310 which can easily be mounted in the oscillator.

As has been described, according to the invention, there is provided a laser oscillator of the type in which a laser is generated by an optical pumping of a laser element by a discharge tube, wherein the improvement comprises a plurality of energy storage circuits provided for the purpose of supplying the exciting power for optically pumping the discharge tube, and wherein the timing of commencement of the supply of exciting power from the energy storate circuits to the discharge tube is controlled in accordance with a predetermined time sequence, whereby the optimum discharge current density is maintained for a longer time period in the discharge tube, thereby remarkably improving the laser efficiency.

Consequently, the scale of the energy storage circuit for a given laser output level can be decreased remarkably. For instance, the capacitances of the capacitors can be reduced considerably. Furthermore, the power consumption of the battery power source can be improved remarkably, so that the size and weight of the laser oscillator as a whole can be reduced advantageously.

What is claimed is:

1. A laser oscillator comprising:
   a laser diode;
   a xenon gas discharge tube having an electrode and a trigger wire surrounding said discharge tube for optically pumping said laser diode in response to a current flowing in said trigger wire and voltage suppled to said electrode;
   a DC power supply unit;
   a first capacitor and at least one second capacitor connected to said DC power supply unit;
   a switching device connected to said second capacitor;
   a choke coil having first and second ends, said first end being connected to said first capacitor and said switching device, said second end being connected to said electrode of said discharge tube;
   a trigger pulse generator for generating a first trigger pulse and at least one second trigger pulse, said first trigger pulse being supplied to said trigger wire, said second trigger pulse being supplied to said switching device to activate said switching device; and
   a timing controller for controlling an interval of said trigger pulses such that the level of a trailing discharge current produced in said discharge tube by a supply of power is raised above a predetermined level before the level of a leading discharge current produced by a preceding supply of power is lowered below said predetermined level.

2. A laser oscillator as recited in claim 1, wherein said switching device comprises a thyristor.

3. A laser oscillator comprising:
   a laser diode;
   a xenon gas discharge tube having an electrode for optically pumping said laser diode;
   a DC power supply means for supplying DC power to said electrode of said discharge tube to maintain the gas in said discharge tube conductive;
   a plurality of capacitors;
   means for supplying said DC power to said capacitors;
   a plurality of switching devices, each connected to each of said capacitors;
   a single choke coil, one end of which is connected to the outputs of said switching devices and the other end of which is connected to said electrode;
   a trigger pulse generator for generating and supplying trigger pulses successively to said switching devices in order to activate said switching devices; and
   a timing controller for controlling an interval of said trigger pulses such that the level of a trailing discharge current produced in said discharge tube by a supply of power is raised above a predetermined level before the level of a leading discharge current produced by a preceding supply of power is lowered below said predetermined level.

4. A laser oscillator as recited in claim 3, wherein said switching device comprises a thyristor.

* * * * *